United States Patent [19]

Garwood et al.

[11] 4,319,090

[45] Mar. 9, 1982

[54] METHOD OF DETERMINING EXISTING SERVICE CAPABILITIES OF TELEPHONE EXCHANGE EQUIPMENT

[75] Inventors: Gerald J. Garwood, Woodbridge, England; Evelyn M. Swenson, Melbourne, Australia

[73] Assignee: Post Office, London, England

[21] Appl. No.: 145,879

[22] Filed: May 1, 1980

[30] Foreign Application Priority Data

May 4, 1979 [GB] United Kingdom ............... 15651/79

[51] Int. Cl.³ ...................... H04M 3/36; H04M 15/38
[52] U.S. Cl. ................................................... 179/8 A
[58] Field of Search ..................... 179/8 A, 9, 7.1 TP, 179/7.1 R, 175.2 C

[56] References Cited

U.S. PATENT DOCUMENTS

| | | | |
|---|---|---|---|
| 3,099,819 | 7/1963 | Barnes | 179/8 A X |
| 3,761,618 | 9/1973 | Alston et al. | 179/8 A |
| 4,103,149 | 7/1978 | Linden et al. | 179/7.1 R X |
| 4,165,447 | 8/1979 | Bertoglio et al. | 179/7.1 R |
| 4,200,771 | 4/1980 | Kraushaar et al. | 179/8 A |

FOREIGN PATENT DOCUMENTS 1194008  6/1965  Fed. Rep. of Germany ..... 179/8 A

OTHER PUBLICATIONS

"A Computerized System for Improved Traffic Data Collection", Paul C. Dinger, *Telephony*, vol. 184, No. 3, Jun. 4, 1973, pp. 37–40.
"The Trunk Forecasting System Tells What, Where, When", Johnson and Maguire, *Bell Labs. Record*, vol. 52, No. 6, Jun. 1974, pp. 193–198.
"Optimizing the Use of Traffic Overload Reroute Controls in the National Telephone Network", R. B. Leipow, *The Western Electric Engineer*, vol. 21, No. 2, Apr. 1977, pp. 16–25.
"Perspectives of Computer-Aided Operation in Long-Haul Communication Networks", Glünder et al., *Siemens Review*, vol. 44, No. 3, Mar. 1977, pp. 125–132.

*Primary Examiner*—Thomas W. Brown
*Attorney, Agent, or Firm*—Larry S. Nixon

[57] ABSTRACT

The availability of service in a telephone exchange is evaluated by a technique which includes monitoring for each call type over a period of time the level of usage of the items of equipment required for that call type and evaluating using the monitored data the probability of each particular item not being able to provide a service when required. The probability figures of the call types can be combined to give an index figure indicative of the availability of service of the exchange.

10 Claims, 19 Drawing Figures

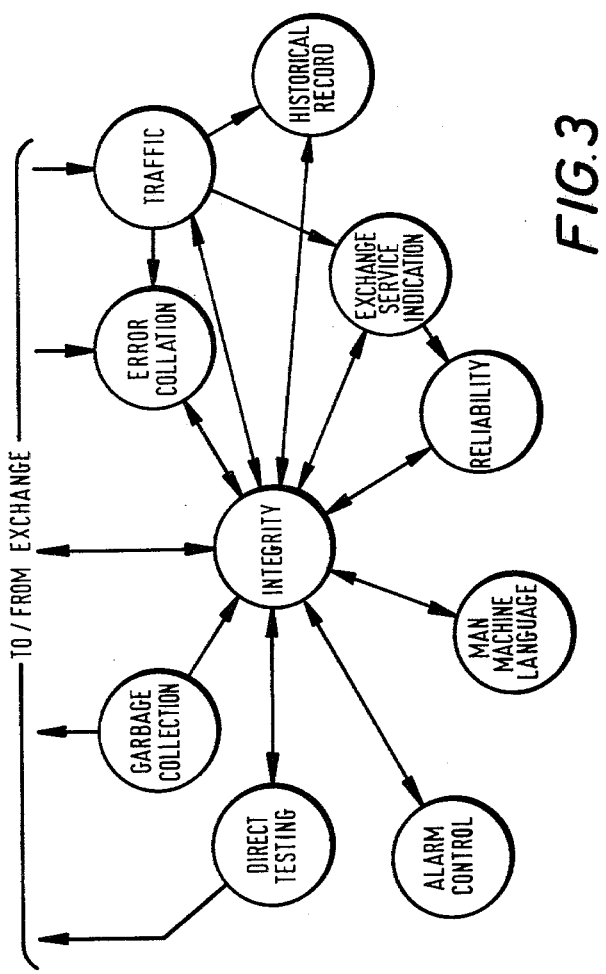

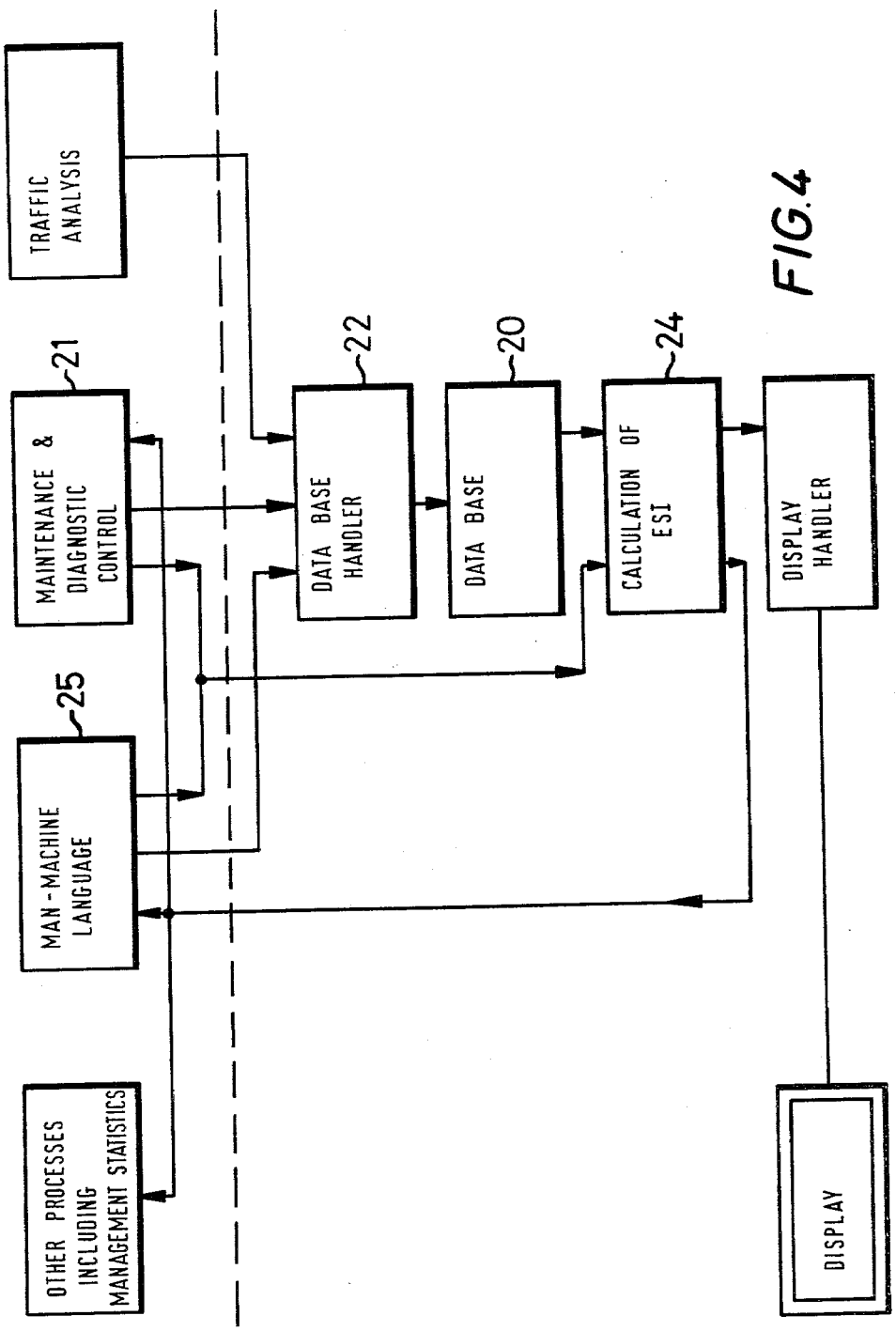

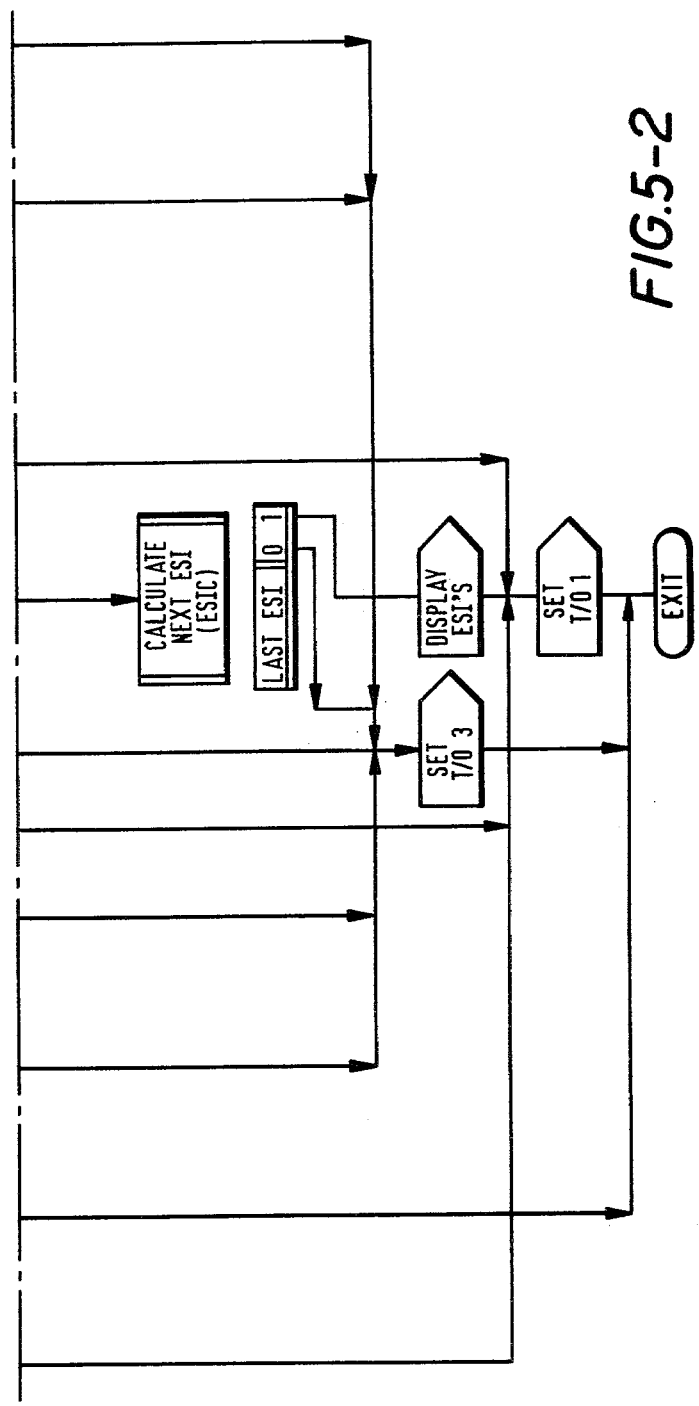

METHOD OF DETERMINING EXISTING SERVICE CAPABILITIES OF TELEPHONE EXCHANGE EQUIPMENT

DESCRIPTION

This invention relates to telephone exchanges. The invention particularly relates to a technique for determining the availability of equipment in a telephone exchange.

It is important to have or to be able to evaluate for a telephone exchange a parameter which represents the capability of that exchange providing the service which it is required to provide. Such a parameter is of particular use for maintenance purposes to establish the consequence of exchange equipment failure on the availability of the service provided by the exchange and also for use in determining what maintenance action needs to be taken including for example, a priority order for correcting faults. At present techniques exist for evaluating parameters which indicate the standard or quality of service provided by a telephone exchange. Such parameters provide information to exchange planners and to those who monitor overall service performance. However, the parameters do not provide information on demand. The measurement methods used rely either upon sampling techniques on live traffic or upon generating test traffic over a period of time. Such parameters are of only limited use to maintenance staff when dealing with faults.

We have identified and developed a technique for evaluating a parameter which provides an up-to-date indication of the quality of service provided by a telephone exchange and an indication of the consequences of any malfunction of equipment in the exchange.

According to the present invention we provide a method of determining the availability of telephone exchange equipment comprising monitoring for each call type in the exchange over a period of time the level of usage of the items of equipment required for that call type, and evaluating using the monitored data the probability of each particular item not being able to provide a service when required.

Generally a telephone exchange offers several different types of call for subscribers. Examples of such call types are own exchange call, out-going junction calls, incoming junction call and tandem calls. Each type of call requires certain items of equipment within the exchange to be connected. Each item of equipment generally includes a number of similar units. The quality of service provided by a particular item of equipment depends upon the number of units provided. Knowing the number of units and having monitored the level of usage of the items of equipment it is possible to obtain the probability of any particular item being able to provide a service when required. Having evaluated the probability for a particular item of equipment using the above defined method it is then possible, knowing the items required for a particular call, to evaluate the probability of a particular call type being successful. An overall figure for an exchange can be obtained by combining the probabilities for all the call types provided by that exchange. This figure can if necessary be modified by applying weighting factors to take account of the relative importance of particular calls and the level of use of a particular service.

In general terms it is possible to evaluate an index figure (ESI) for an exchange which represents the availability of service in the exchange using the formula:

$$ESI = |A - B/C| \times \text{scale factor}$$

where
$A = 0$ or $1$
$B = Y \times W$ $$Y = \sum_{i=1}^{N} P_i \text{ or } \prod_{i=1}^{N} P_i$$

$W =$ weighting factor
$C =$ normalization factor
$P_i =$ probability figure for each item of equipment.

The present method is particularly suitable for use in a stored program control type exchange. Such an exchange is easily modifiable so that it can monitor the level of usage of particular items of equipment and the particular services provided by the exchange. However the method is not limited in application to this type of exchange and it is possible to employ it in for example, a Strowger exchange by providing appropriate monitoring equipment for monitoring calls.

The invention will be described now by way of example only with particular reference to the accompanying drawings. In the drawings:

FIG. 3 is a diagram illustrating the operational processes of the Pathfinder exchange;

FIG. 4 is a block diagram illustrating how the present method can be incorporated in the Pathfinder exchange;

FIGS. 5-1 and 5-2 show a flowchart illustrating how the present invention can be implemented;

Figure 1:
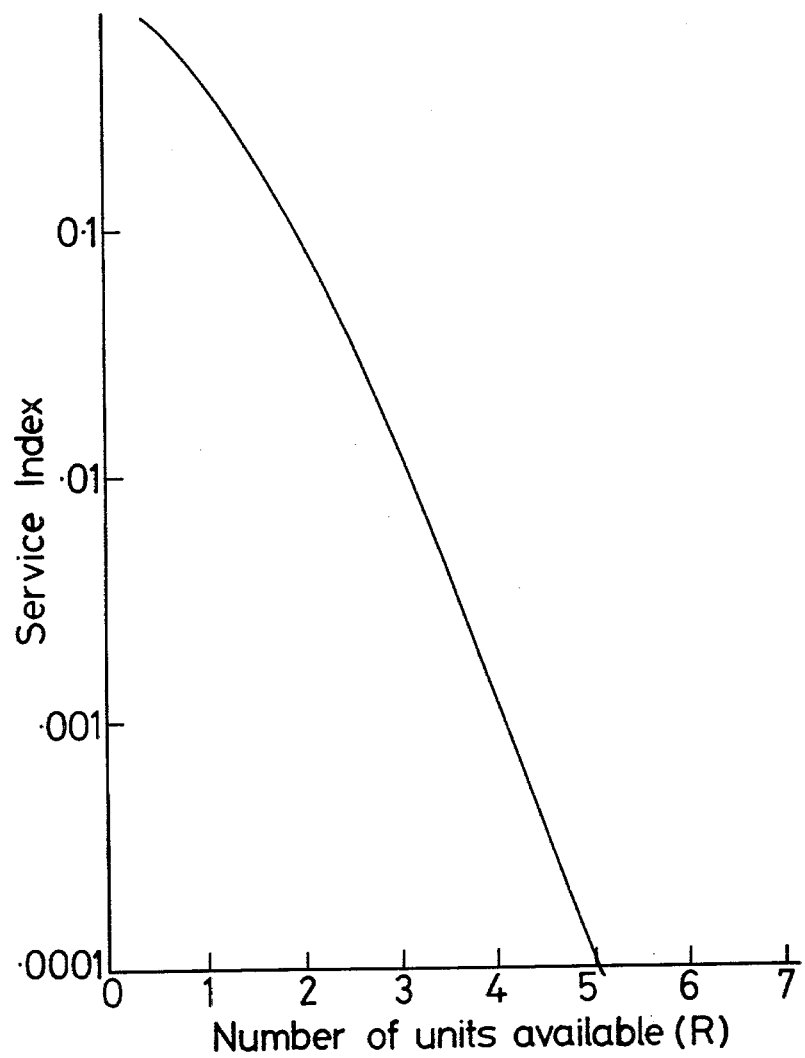
FIG. 1 is a graph illustrating the variation of a parameter evaluated in accordance with the present invention.

The present description illustrates the invention by reference to what is known as the Pathfinder exchange. This is a stored program control type exchange and is described in detail in an article entitled "Pathfinder: an Experimental Telephone Exchange using Stored Program Control" by Smith C.S.A. and Park I.D.C. published in Post Office Electrical Eng. Journal 70 Part 2 Pages 68–75 (July 1977).

The types of telephone call offered by a telephone exchange can be divided into the following four mutually exclusive types:

1. Own exchange calls
2. Outgoing junction calls
3. Incoming junction calls
4. Tandem junction calls.

The following description will explain the manner in which what we term a service index figure can be established for each type of call. To establish a service index figure it is necessary to consider the equipment involved in setting up a call. Broadly speaking the exchange equipment can be considered in two groups. The first group comprises what will be referred to as traffic carrying equipment and includes the equipment which interfaces directly with traffic generated by a subscriber, e.g. a reed relay switch or supervisory unit. The first group also includes software associated with the control of equipment involved in setting up a call through the exchange. The second group comprises equipment which performs control functions or provides support or both to enable other equipment including the traffic carrying equipment to function correctly. Examples are a microprocessor unit or a power supply.

In considering service indication emphasis will be placed on the traffic carrying equipment since this is the equipment which directly affects the service provided for telephone users. In the Pathfinder exchange approximately two thirds of the equipment can be classified as traffic carrying equipment. Broadly speaking the following traffic carrying equipment can be identified in the Pathfinder exchange:
1. Customer's Line Units
2. A switch matrices (reed relays)
3. B switch matrices
4. C switch matrices
5. Supervisory Units.

Although there appears to be five independent sets of traffic carrying equipment, each customer's line is permanently connected to one line unit and one set of reed relays forming that customer's equipment number. The failure of either the line unit or the reed relay will make that number unusable so that these two sets can be treated as one for the present purposes. Similarly each supervisory unit is permanently connected to one set of reed relays and again these two can be treated as one. Hence on the Pathfinder exchange there are three sets of mutually exclusive traffic carrying equipment:
a. Customer Equipment
b. The B switch
c. Supervisory Equipment.

It is important in the evaluation to identify the sets of mutually exclusive traffic carrying equipment.

Each time a call is routed through the Pathfinder a part of each of the above three sets will be required in an amount which varies according to the actual call type involved.

Each set of traffic carrying equipment can contain a number of separate similar units. For example, the B switch in the Pathfinder exchange consists of six separate identical sets of reed relay matrices. The service offered by each traffic carrying equipment set therefore depends upon the number of similar units which are available to perform their function satisfactorily. If any unit is faulty or not available for some reason the service offered by that traffic carrying equipment is reduced.

Our proposal is to obtain a service index figure in the following manner. Consider an exchange which is operating correctly and for each occasion that a particular set of traffic carrying equipment is required monitor the number of similar units needed. From the monitored figure it is possible to establish how often a given number of similar units are required for use. If the period of measurement is sufficiently large the proportion of all occasions (tx) when a given number of similar units is needed is given by $$t_x = \frac{O_x}{\sum_{i=o}^{i=n+1} O_i}$$

where
x = a particular number of similar units in the range 1 to n+1
$O_x$ = the number of occasions when x similar units are needed and
n = the total number of similar units provided.

The tx values can be summed as follows $$\sum_{i=1}^{i=m} (tx)_i$$

where m is the number of similar units needed in the range 1 to n. The proportion of all occasions (Q) when at least m similar units would be sufficient to meet demand can hence be established. (1−Q) represents the proportion of all occasions when m similar units would not have been sufficient. If the number of similar units needed equals the number of units (k) available and able to function correctly the (1−Q) figure for k similar units is a measure of the service available. Hence we define service index as the probability of not being able to provide a service when that service is required, $$\text{i.e. Service Availability} = 1 - \sum_{i=1}^{i=k} (tx)_i$$

Our proposal is to monitor the usage of the units of each set of traffic carrying equipment and to evaluate a service index figure for each set of traffic carrying equipment in the above manner. This can be done by a simple modification of the program stored in the Pathfinder exchange. In an exchange which does not have a stored program control monitoring equipment would need to be provided to monitor the level of usage of the various units of each set of traffic carrying equipment.

To illustrate the method Table 1 gives an example of a hypothetical set of traffic carrying equipment (TCE) showing the number of similar units and the number of occasions a given number are required for use. From these figures the values tx, Q and (1−Q) have been evaluated. In this example n (the total number of similar units provided) is 5 so that on 3 occasions all the available similar units were in use. The (1−Q) figures are plotted in the graph shown as FIG. 1. This indicates how the service index value changes as k, the number of similar units available, increases from 1 to 5.

This technique can be used to establish a service index graph for each set of traffic carrying equipment in the pathfinder exchange. The computations can be carried out by existing equipment and the figures displayed on a display unit. Thus, the figures can be made readily available to, for example, maintenance crews. The use of the figures for maintenance purposes will be explained below.

TABLE 1

| | | HYPOTHETICAL SET OF TCE SHOWING NUMBER OF SWUs AND PROPORTION OF ALL OCCASIONS (tx) (Q) & (1-Q) | | | |
|---|---|---|---|---|---|
| Number Of Similar Working Units SWUs | Number Of Occasions Given Number Are Needed | Proportion Of Occasions Given Number Are Needed (tx) | Proportion Of Occasions When At Least Given No Are Sufficient (Q) | Proportion Of Occasions When Given No Are Not Sufficient (1-Q) |
| 1 | 1 | 15378 | 0.5787077 | 0.5787077 | 0.42 |

TABLE 1-continued

HYPOTHETICAL SET OF TCE SHOWING NUMBER OF
SWUs AND PROPORTION OF ALL OCCASIONS (tx) (Q) & (1-Q)

| Number Of Similar Working Units SWUs | Number Of Occasions Given Number Are Needed | Proportion Of Occasions Given Number Are Needed (tx) | Proportion Of Occasions When At Least Given No Are Sufficient (Q) | Proportion Of Occasions When Given No Are Not Sufficient (1-Q) |
|---|---|---|---|---|
| " | 2 | 8562 | 0.3222067 | 0.9009144 | 0.099 |
| " | 3 | 2295 | 0.0863658 | 0.9872802 | 0.013 |
| " | 4 | 302 | 0.0113649 | 0.9986451 | 0.0014 |
| " | 5 | 33 | 0.0012418 | 0.9998869 | 0.00011 |
| n + 1 | 6 | 3 | 0.0001130 | 0.9999999 | 0.0000001 | n = TOTAL NUMBER OF SWUs PROVIDED

Having established a service index figure for each set of traffic carrying equipment it is possible to extend this concept to evaluate a service index figure for the exchange itself. For a call to be successful all the traffic carrying equipment involved in the call must function correctly. Since the sets of traffic carrying equipment are mutually exclusive the probability that a call is successful can be expressed as a product of all the probabilities of each set of traffic carrying equipment functioning correctly. Thus, the probability (P) of a call type being successful can be expressed as follows:

$$P = (1 - R_1)(1 - R_2)(1 - R_3) \ldots (1 - R_m) \quad \text{(Equation 1)}$$

where $1, 2, 3 \ldots m$ = number of traffic carrying equipments involved in one particular call type. $R_m$ = service index figure for a particular set of traffic carrying equipment.

This FIGURE can be evaluated for the Pathfinder exchange by a simple modification of the existing program as indicated above.

The probability figure expressed above does not take any account of the relative importance of particular types of call. The services provided by some call types are judged to have a higher priority classification than others. For example the STD (Subscriber Trunk Dialing or DDD, Direct Distance Dialing) service is heavily used by business customers and its availability is of considerable importance. Other services such as the emergency services are important as a social service although they are relatively rarely used. To gauge service priority a weighting factor (T) can be attached to each call type to reflect the following 1. Service usage
2. Social importance.

A reasonable method of determining service usage is to measure the proportion of time an exchange spends handling that service in relation to the time spent handling all services. In this way the customers by using the services will establish their own priorities. The proportion of time the Pathfinder exchange spends handling its various call types is given in Table 2.

The social importance of any particular call type is more difficult to express numerically. In considering social importance it is necessary to assess the implications of not having the service available.

To combine the service usage weighting (U) and social importance weighting (I) to provide and priority weighting (T) for each service, the following formula has been arrived at $$T_x = \frac{U_x I_x}{\sum_{i=1}^{i=r} U_i I_i}$$

where x = the particular service involved and r = the total number of services provided.

TABLE 2

PROPORTION OF TIME PATHFINDER
SPENDS HANDLING EACH CALL TYPE
INDICATING ITS USAGE

| CALL TYPE | IDENT | TIME SPENT ON CALL TYPE (SEC) | PROPORTION OF TOTAL TIME |
|---|---|---|---|
| OWN EXCHANGE | U0/E | 42517.7 | 0.073 |
| O/G LEVEL 0 | U0 | 65705.5 | 0.11 |
| O/G LEVEL 9 | U9 | 225296.6 | 0.39 |
| O/G LEVEL 2 | U2 | 89546.2 | 0.15 |
| O/G LEVEL 1 | U1 | 2227.2 | 0.0038 |
| O/G LEVEL 80 | U80 | 2135.9 | 0.0037 |
| O/G LEVEL 82 | U82 | 15839.9 | 0.027 |
| I/C LEVEL 4 | U4 | 81801.0 | 0.14 |
| I/C LEVEL 65 | U65 | 56741.8 | 0.098 |
| TOTAL TIME 581811.8 sec. | | | |

Using this equation a service priority of FIG. T has been evaluated for each call type on the Pathfinder exchange. These values are given in Table 3. The I values have been allocated to each call type by a department within the Post Office.

Having allocated priority ratings to particular call types it is possible to arrive at an exchange service index figure by combining the probability figures and the priority figures. The exchange service index (ESI) can be expressed as follows:

$$EST = 1 - (P_1 T_1 + P_2 T_2 + P_3 T_3 \ldots P_N T_N)$$

where $1, 2, 3 \ldots N$ = the number of mutually exclusive call types.

$P_N$ = the probability of each call type being successful.

$P_N$ = service priority weighting for each call type.

In the Pathfinder exchange there are three basic types of call available; an own exchange (OE), an outgoing junction (OG) and an incoming junction (IC) call. The probabilities P(OE), P(OG) and P(IC) for each of these call types being successful can be determined using the following equations.

TABLE 3

SERVICE PRIORITY VALUE FOR EACH
CALL TYPE ON PATHFINDER

| CALL TYPE | IDENTITY | U VALUE | I VALUE | UI | T |
|---|---|---|---|---|---|
| OWN EXCHANGE | $T_{O/E}$ | 0.073 | 0.15 | 0.011 | 0.072 |

TABLE 3-continued

SERVICE PRIORITY VALUE FOR EACH CALL TYPE ON PATHFINDER

| CALL TYPE | IDENTITY | U VALUE | I VALUE | UI | T |
|---|---|---|---|---|---|
| O/G LEVEL 0 | $T_0$ | 0.11 | 0.11 | 0.012 | 0.078 |
| O/G LEVEL 9 | $T_9$ | 0.39 | 0.25 | 0.098 | 0.64 |
| O/G LEVEL 2 | $T_2$ | 0.15 | 0.07 | 0.010 | 0.065 |
| O/G LEVEL 1 | $T_1$ | 0.0038 | 0.2 | 0.00076 | 0.0050 |
| O/G LEVEL 80 | $T_{80}$ | 0.0037 | 0.02 | 0.000074 | 0.0005 |
| O/G LEVEL 82 | $T_{82}$ | 0.027 | 0.02 | 0.00054 | 0.0035 |
| I/C LEVEL 4 | $T_4$ | 0.14 | 0.07 | 0.0098 | 0.064 |
| I/C LEVEL 65 | $T_{65}$ | 0.098 | 0.11 | 0.011 | 0.072 | note $T = \dfrac{UI}{\Sigma UI}$ $\Sigma_{UI} 0.153$ $$P(OE) = (1-A)^2(1-B)^2(1-C)(1-F)$$

where
A = service index for customer equipment
B = service index for B planes
C = service index for Registers
F = service index for OE supervisories
Note for OE calls two customer equipments and two B planes are required.

$$P(OG) = (1-A)(1-B)^2(1-C)(1-D_n)$$

where A, B and C are as indicated above:
$D_n$ = service index for the particular type of OG supervisory $$P(IC) = (1-A)(1-B)(1-E_Y)$$

where A and B are as indicated above and $E_Y$ = service index for the particular type of IC supervisory.

The ESI figure for the Pathfinder exchange can thus be expressed as follows:

$$ESI = 1 - [P(IC) \, T(IC) + P(OG) \, T(OG) + P(OE) \, T(OE)]$$

This FIGURE can be evaluated for the Pathfinder exchange by providing appropriate monitoring equipment and modifying the existing program for the exchange. The overall ESI figure can be displayed on a suitable display apparatus so that it is readily available for maintenance purposes.

The ESI figure can be useful in several situations. Firstly it provides a reference on which to judge the performance of the exchange and also the consequences of any fault occurring in the exchange. Figures for the Pathfinder exchange show that when it is functioning correctly the ESI equation given above provides a figure of 0.0003. However at present this exchange is over-equipped for its present relatively low level of traffic in anticipation of traffic growth in the future.

If a fault develops for example in an outgoing microprocessor, all the junctions which this unit controls have to be removed from the service to isolate the fault. The effect of this action can be assessed by determining the ESI value with all these junctions isolated. This gives a figure of 0.0014. This figure can be interpreted by maintenance staff to assist them in determining whether to deal with this fault now or defer it for attention later. Had the failure been in one of the power supplies on a supervisory rack the ESI figure would equal 0.0094. Thus by evaluating the ESI figure for various types of fault it is possible to ascertain their relative seriousness.

The ESI figure can also be used to evaluate the consequences of maintenance action. When for example it is necessary to replace a unit a part of which is still providing good service, e.g. a microprocessor unit, it is possible simply by consulting the ESI figure before cutting out that unit to ascertain the consequences of that action on the service available.

The ESI figure can also be used to determine a priority order for repairing a number of faults in equipment. Consider the following situation on the Pathfinder exchange.

TABLE 4

CONSEQUENCES OF FOUR FAULTY UNITS

| | SAL | Xpt | SPS | O/G 9 | ESI |
|---|---|---|---|---|---|
| a | X | X | X | X | 0.0826 |
| b | X | | | | 0.0074 |
| c | | X | | | 0.0003 |
| d | | | X | | 0.0771 |
| e | | | | X | 0.0008 |
| f | X | X | | X | 0.0062 |
| g | | X | | X | 0.0008 |

SAL = Supervisory Access logic.
SPS = Scan & Park Store
ES = Exchange Service Index
Xpt = Cross point Control Store
O/G 9 = Outgoing Supervisory Level 9
X = indicate Faulty unit Four items of equipment, a supervisory access logic (SAL), a cross point control store on the B plane (Xpt), a scan and park store (SPS) and an OG level 9 junction supervisory (OG 9) have all been removed from service. The ESI value is 0.0826 (see Table 4 row a) indicating a serious fault situation. By determining the ESI value for each of the above mentioned units failing in isolation, the effect on the system of that individual failure and hence its relative importance can be evaluated. Looking at Table 4 it can be seen that the Xpt failure has a very small effect on the system, whilst the SPS fault is more serious with an ESI value of 0.077. Thus the following would be the order of repair:

1st—SPS
2nd—SAL
3rd—OG 9 and
Last—Xpt.

Thus, it can be seen that the method allows determination of the availability of service in a telephone exchange. This determination can be carried out by providing monitoring equipment for monitoring the level of usage of the various items of equipment and evaluating the ESI figure.

The above is one example of the way in which an ESI figure can be evaluated. There are alternative ways and one alternative will be considered briefly now.

Considering equation (1), the probability of a call type N being successful is the product of the mutually exclusive probabilities of finding a free unit of each TCE, $$P_N = Q_1 \cdot Q_2 \cdot Q_3 \ldots Q_k$$

where $Q_k$ = probability of finding a free unit of TCE, type k, with the currently available number of units.

If the exchange is handling N different call types then a combined probability for these call types can be evaluated. The demand for TCE is measured without distinction of call types and hence the individual P values represent the probability of success in the presence of all call types. In the absence of congestion the P values will be statistically independent since the probability of success of a given call type will then not be affected by the simultaneous handling of other call types. In general P values will not be mutually exclusive because common equipment (i.e. TCE shared between more than one call type) will be involved. An ESI figure can be expressed by combining the probability figures as follows:

$$ESI = 1 - (P_1 \cdot P_2 \ldots P_N).$$

ESI evaluated in this way is a number the variation of which is indicative of variations in the service provided by the exchange. ESI would vary in the range 0 to 1 increasing as the service degrades.

This derivation of ESI does not include priorities but these can be treated as a separate matter.

Figure 2:
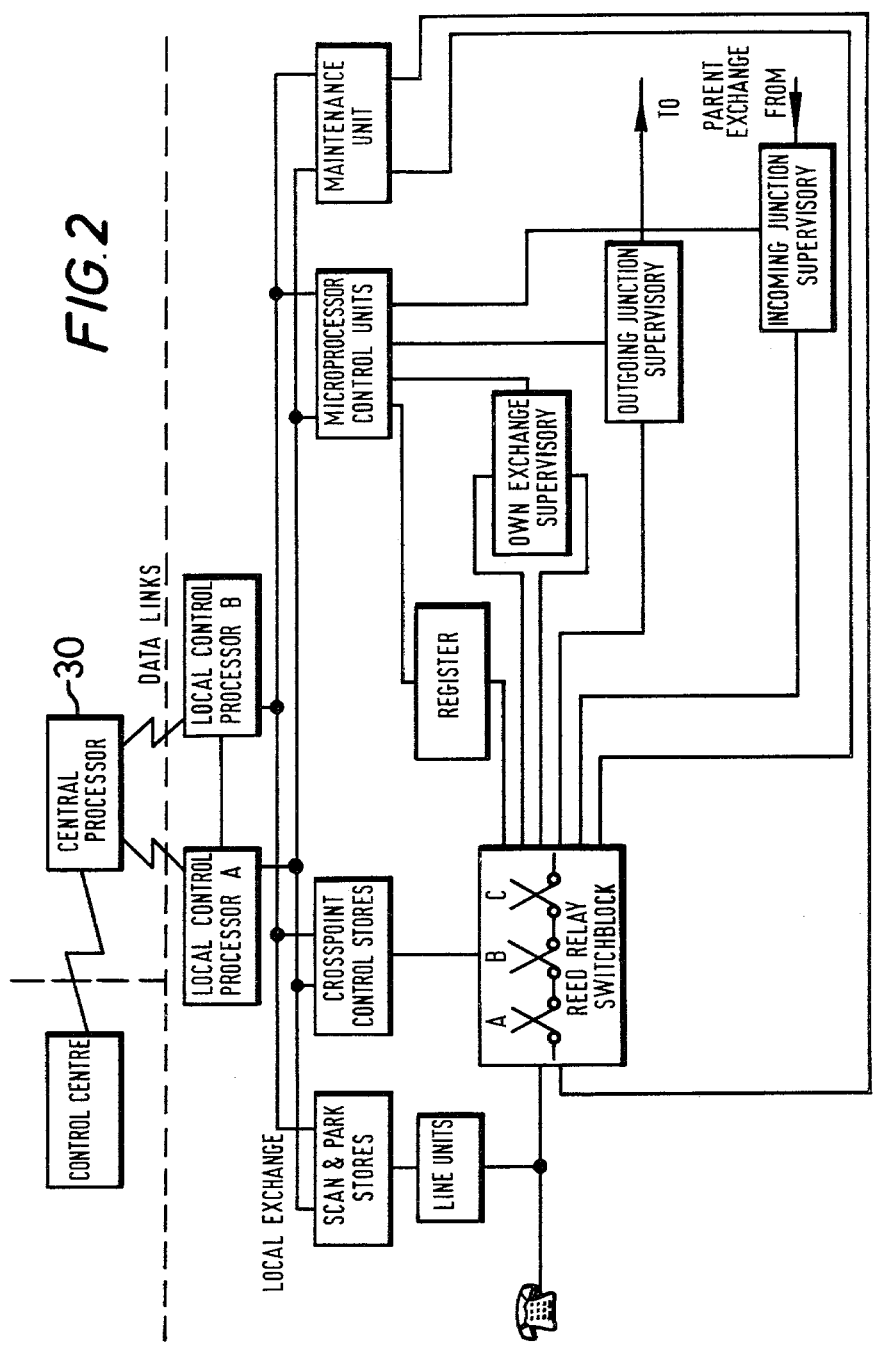
FIG. 2 is a block schematic diagram of the Pathfinder exchange.

The ESI technique has been designed to be implemented on any processor, in particular one suited to the control of telephone exchanges. The Pathfinder exchange described in the Smith and Park article referred to above is structured as shown in FIG. 2. The Pathfinder exchange has software incorporated to implement a maintenance strategy of which ESI forms a part as illustrated in FIG. 3. The interface between the ESI process and the other processes of the exchange is shown in general form in FIG. 4.

To enable the ESI calculation to be undertaken on a real time basis the data base (block 20 in FIG. 4) must be kept up to date with accurate data relating to inter alia TCE usage, numbers of similar units etc. The method of determining TCE usage will vary from system to system and be related to what data and information is available. In any event demand figures should not be accumulated under fault conditions.

To keep the data base up to date the traffic analysis process and the maintenance and diagnostic control process (block 21) of Pathfinder are given access to the data base 20 via its own handler 22 to allow up to date traffic statistics and fault information to be automatically passed to the ESI process 24. In addition data can be changed manually via the man-machine language process (block 25).

The ESI calculation 25 can be obtained either at regular intervals or on demand from a request by either the man-machine language 25 or the maintenance and diagnostic process 21. The result of the calculation will always be returned to the process that originated the request but, in addition, can be displayed on a display device 26.

In the Pathfinder exchange (FIG. 2) the central processor 30 is a Honeywell 6/06 computer which is commercially available. The software is written in assembler code and interaction between processes is by task passing through a purpose written operating system which controls scheduling and input/output.

Figure 5A:
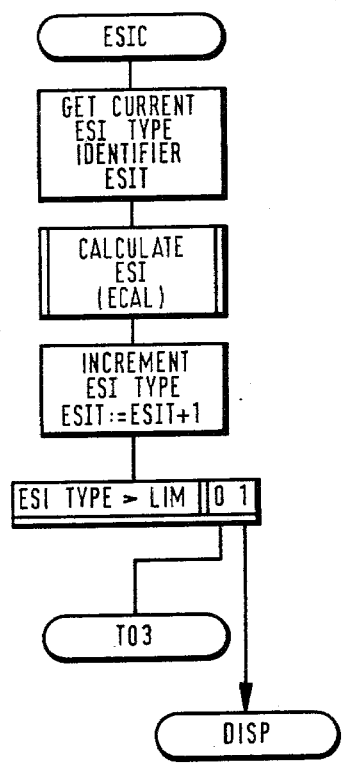
FIGS. 5a to 5j are flowcharts illustrating the modules of FIG. 5 in more detail.
Figure 5F:
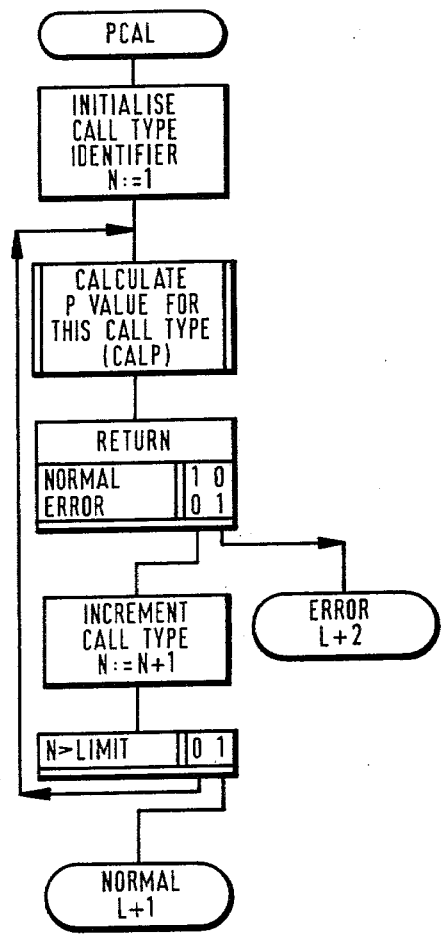
Figure 5B:
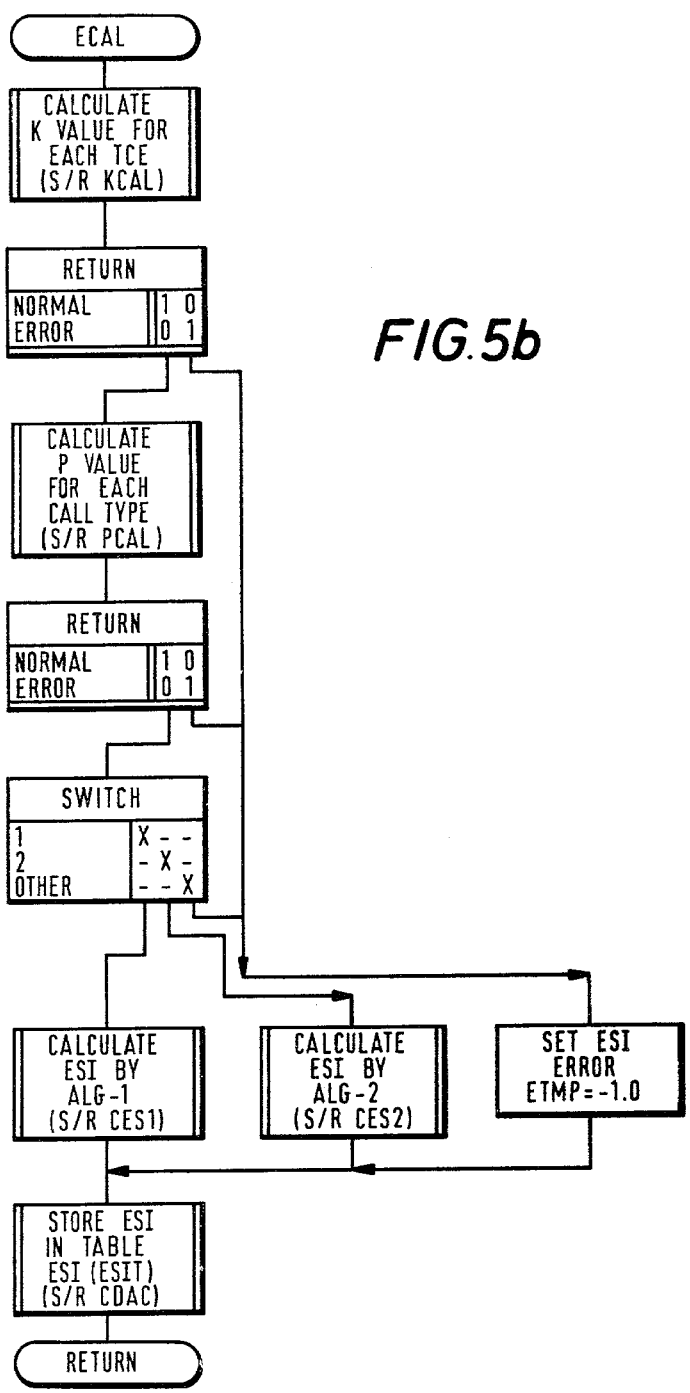
Figure 5C:
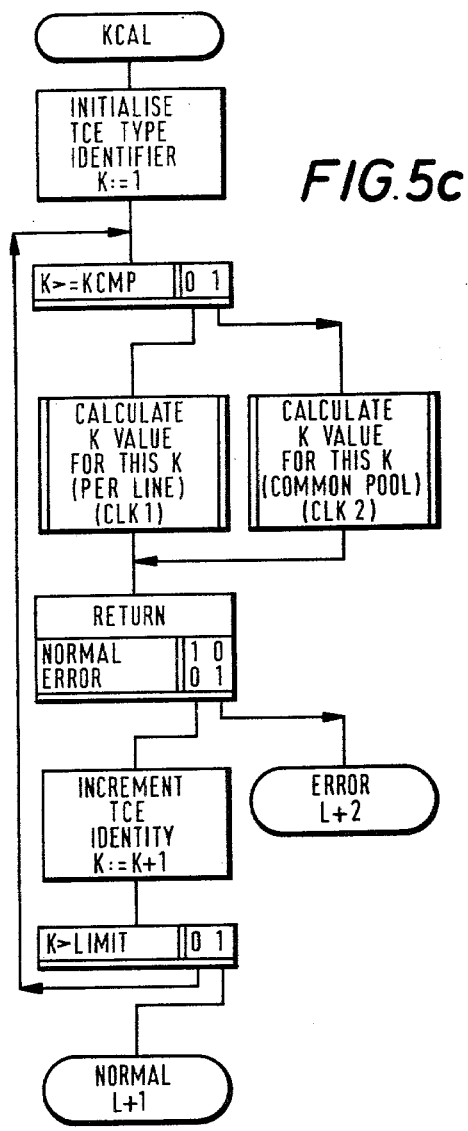
Figure 5D:
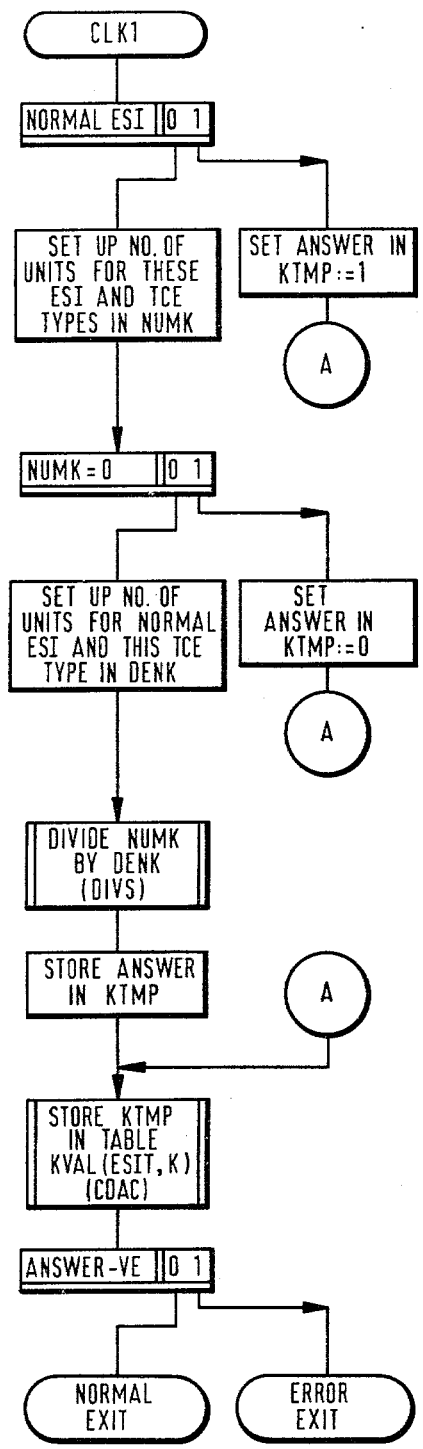
Figures 1, 5E:
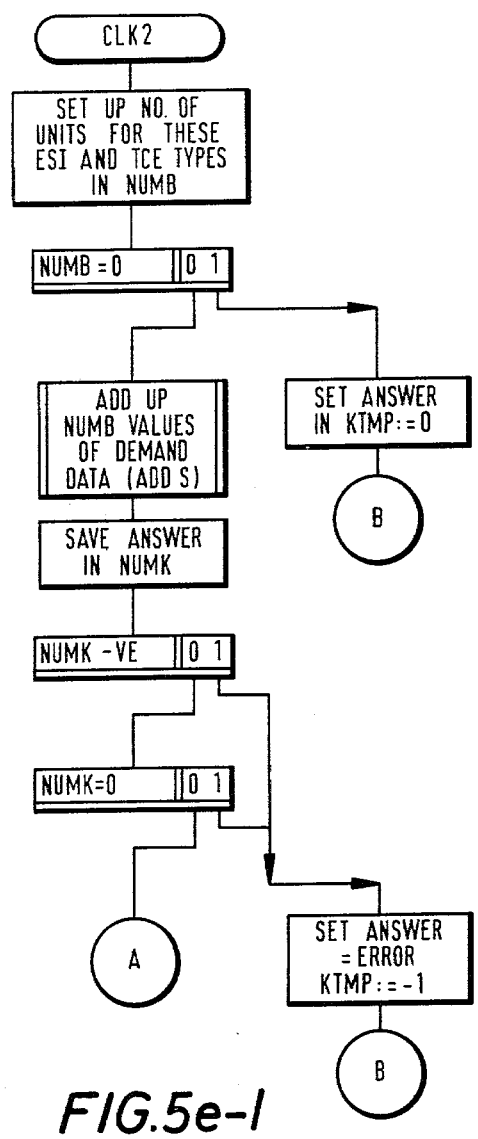
Figures 2, 5E:
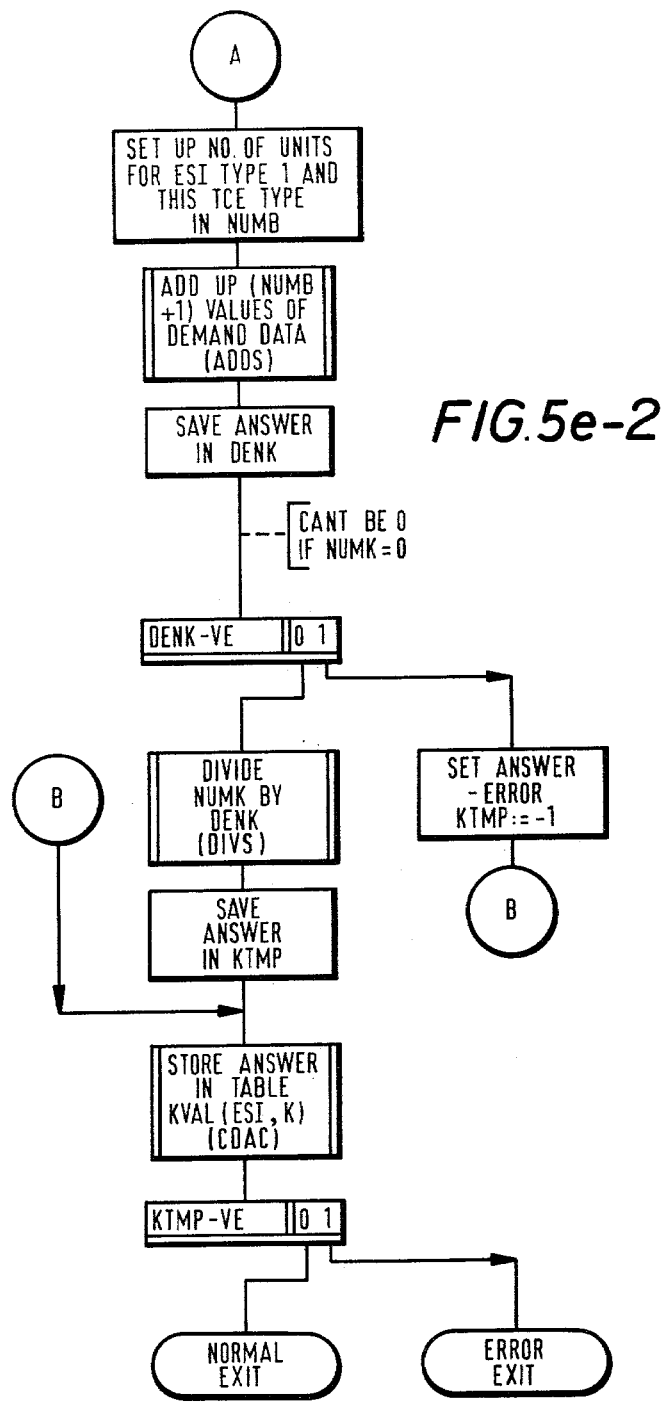
Figure 5G:
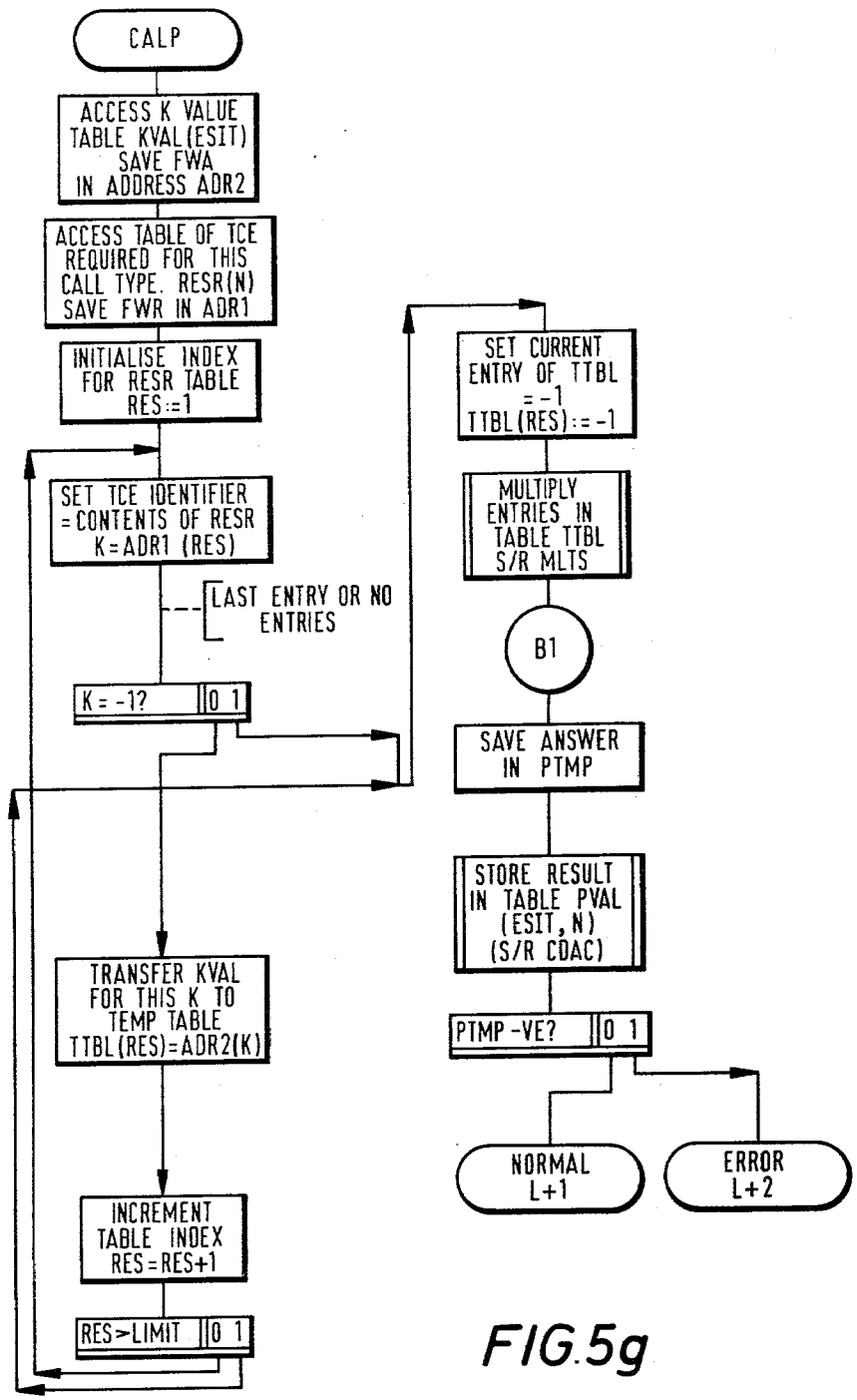
Figure 5H:
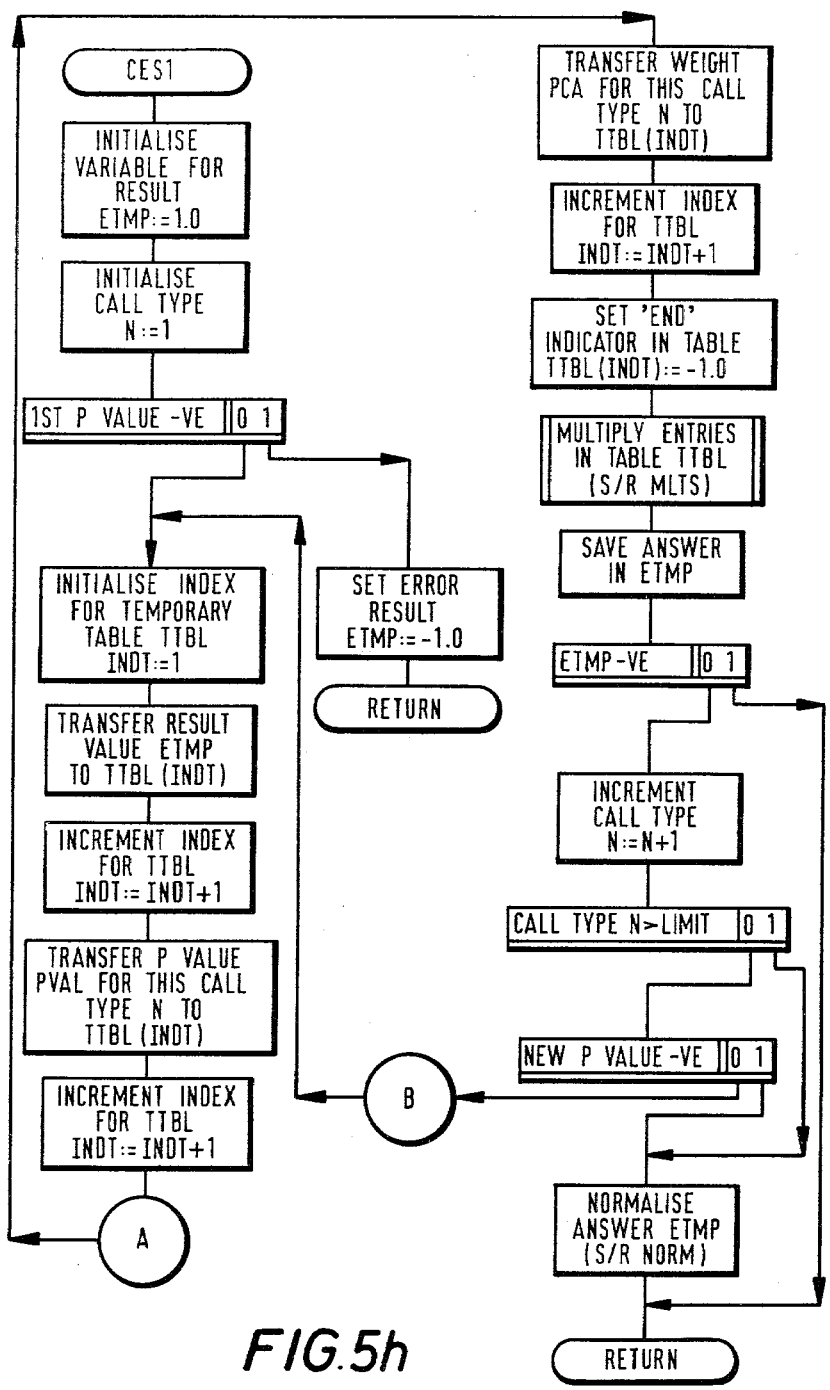
Figure 5I:
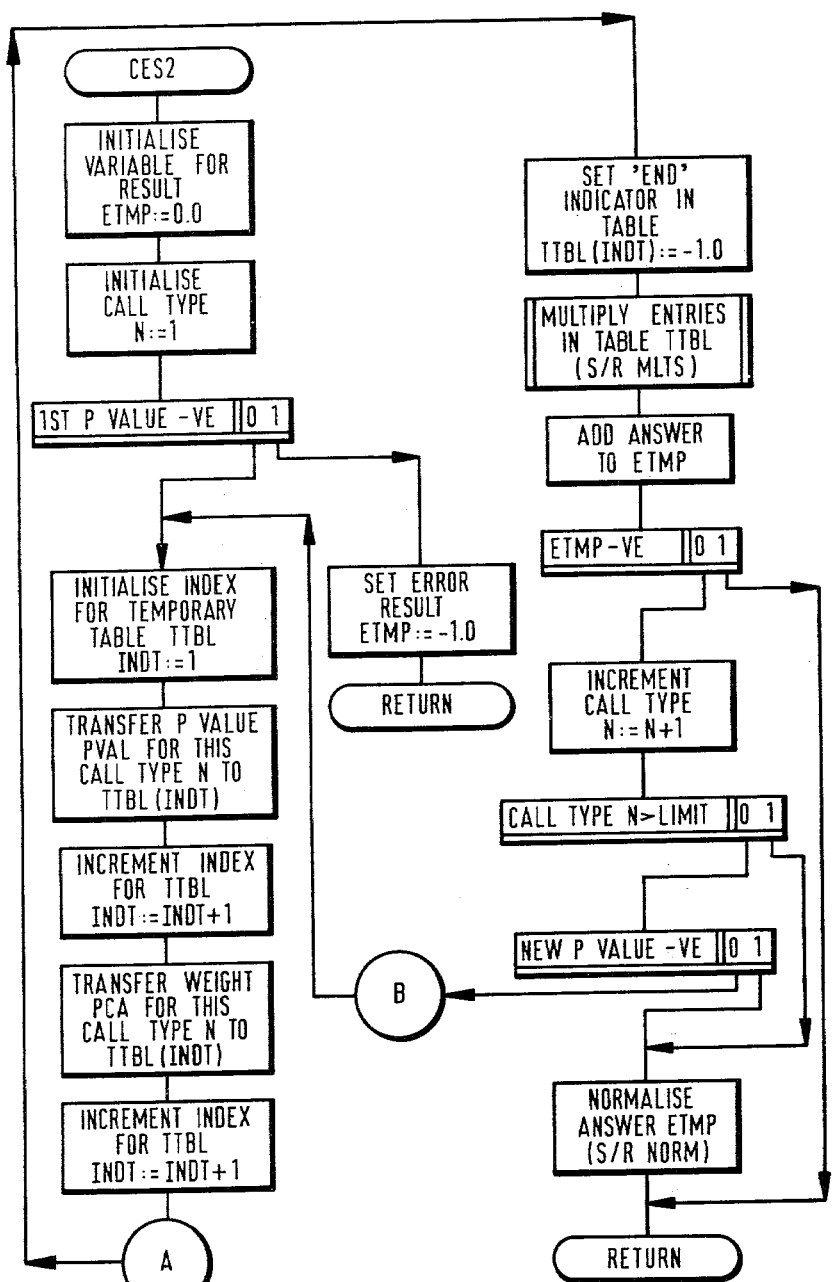
Figure 5J:
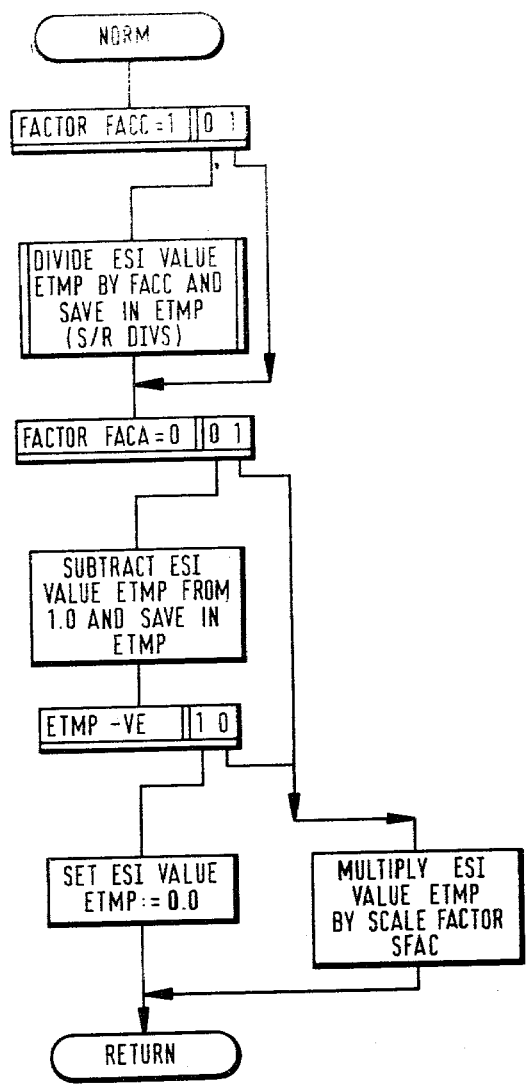
Figures 1, 5:
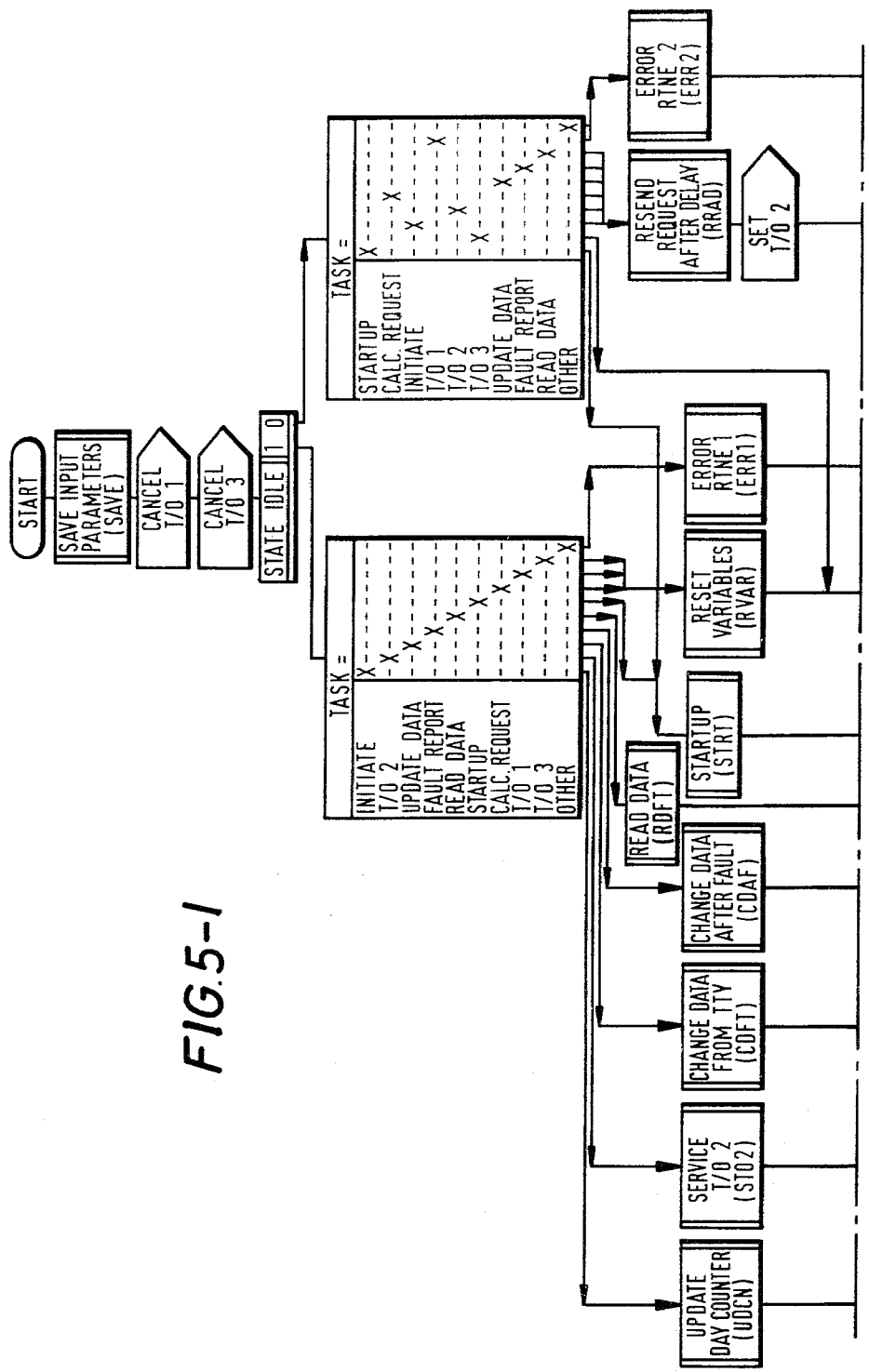

One form in which the ESI calculation can be implemented is illustrated in the flowchart of FIG. 5-1 and 5-2. FIG. 5-1 and 5-2 gives the logical structure of a program for carrying out the ESI calculation and complements FIG. 4 to provide the top level information required for the ESI calculation.

Some of the subroutines associated with the modules of FIG. 5 are shown in FIGS. 5a to 5j. FIG. 5a shows the subroutine for calculating the next ESI and FIG. 5b the subroutine for calculating ESI. FIGS. 5c and 5d give subroutines for calculating K values (which correspond to Q's referred to earlier). FIG. 5e-1 and 5e-2 gives the subroutine for K when TCE is provided on a commonpool basis. The algorithm is $$K = \frac{\sum_{i=1}^{m} O_i}{\sum_{i=1}^{n+1} O_i}$$

where
$O_i$ = demand for i units
m = number of available units
n = number of equipped units.

FIG. 5f is the subroutine for calculating P values for each call type identifier and FIG. 5g is the subroutine for calculating P for a given call type according to $$P = K(i) \times K(j) \times \ldots \times K(z)$$

where i, j . . . z of the TCE required are given in the table RESR (FIG. 5g).

FIG. 5h is the subroutine for calculating ESI from the following general formula which has been found to apply $$ESI = |A - B/C| \times S$$

where
A = 0 or 1

$$B = \prod_{i=1}^{N} P_i W_i \, (i = \text{call type})$$

$W_i$ = weighting factor for each call type
C = normalization factor
S = scale factor.

FIG. 5i gives a similar subroutine to FIG. 5h but here $$B = \sum_{i=1}^{N} P_i W_i$$

FIG. 5j is a normalization subroutine.

Figure 6A:
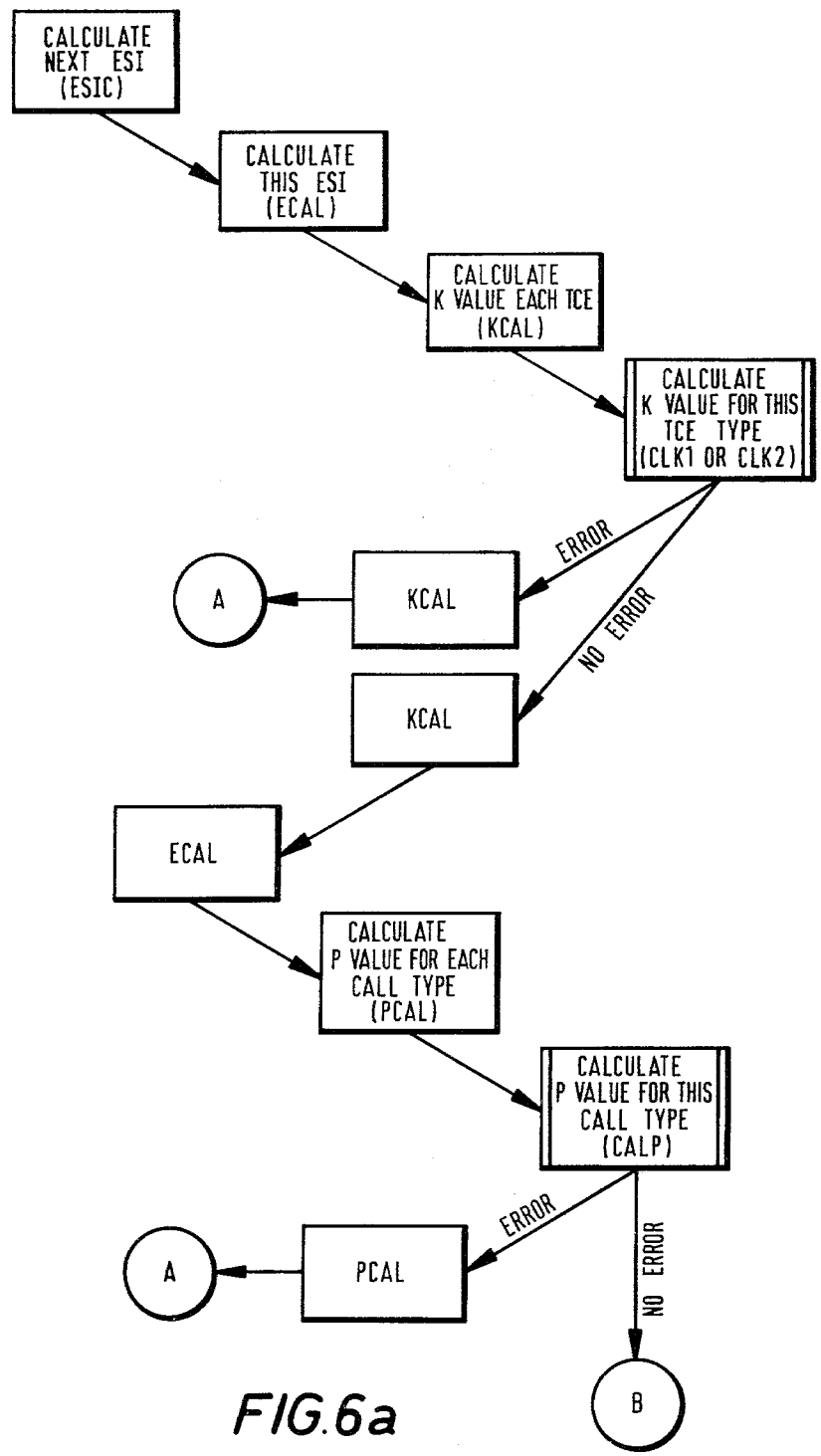
FIGS. 6a and 6b show the order in which the subroutines of FIGS. 5a to 5j are implemented.
Figure 6B:
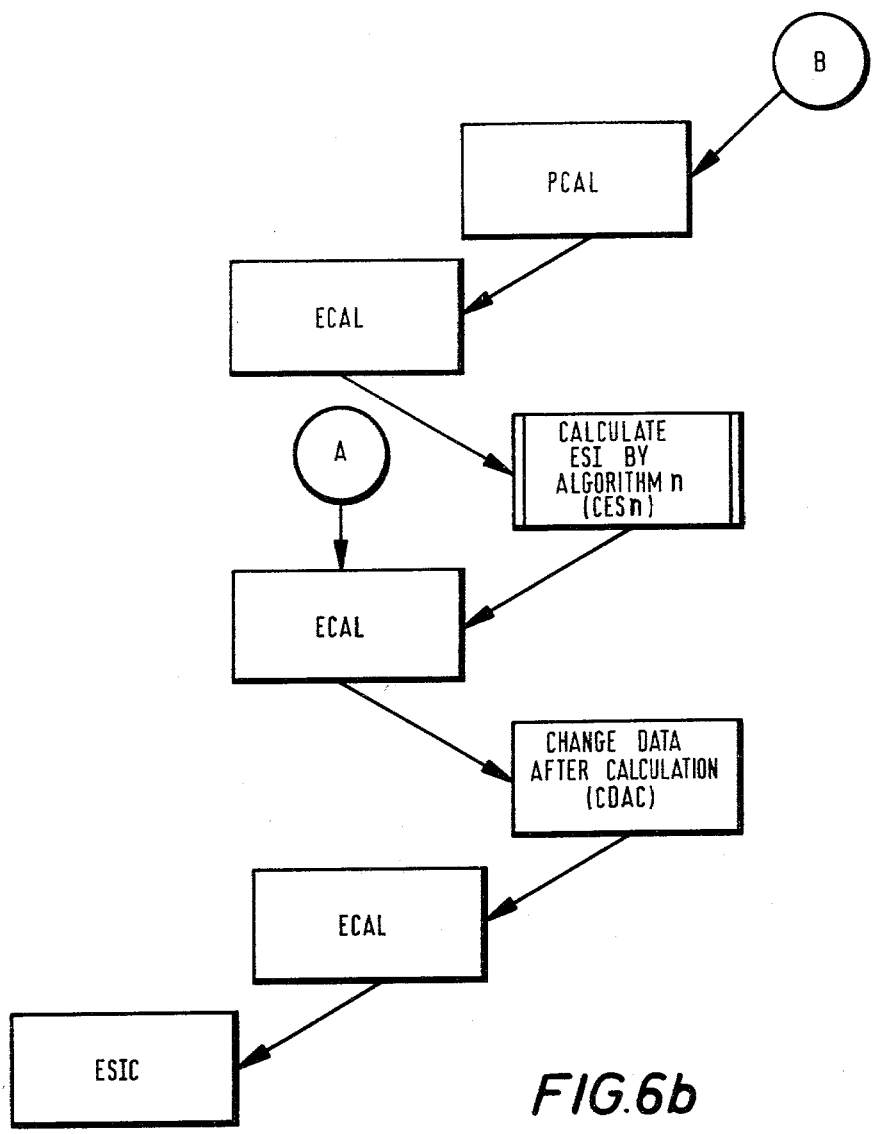

FIGS. 6a and 6b show the order in which the various subroutines are called and the levels they occupy within the main program.

We claim:

1. A method of indicating the service provided by telephone exchange equipment having plural items of equipment and capable of processing plural types of telephone calls, said method comprising:

monitoring, over a period of time, the normal expected level of usage of items of equipment required for each call type, and using said monitored expected level of usages, evaluating, for the number of items of equipment available at a given time, the probability of no items of a particular required type of equipment being able to provide a service when required.

2. A method as claimed in claim 1 including identifying for each call type the items of mutually exclusive equipment required for a call, and enumerating the number of similar units of each item.

3. A method as claimed in claim 1 or claim 2 including combining the probability figures for each item to obtain an index figure representative of the probability of a particular call type being successful.

4. A method as claimed in claim 3 wherein the combining step includes summing.

5. A method as claimed in claim 3 which includes combining the index figures for call types to obtain an index figure representative of the availability of service of the exchange.

6. A method as claimed in claim 5 which includes assigning a weighting factor to the index figure for each call type.

7. A method as claimed in claim 6 wherein the weighting factor includes an element based on the relative usage of each call type.

8. A method as claimed in claims 1 or 2 including evaluating an index figure (ESI) representing the availability of service in an exchange using the formula:

$$ESI = \left| A - \frac{B}{C} \right| \times \text{scale factor}$$

where
$A = 0$ or $1$
$B = Y \times W$ $$Y = \sum_{i=1}^{N} P_i \text{ or } \prod_{i=1}^{N} P_i$$

$W$ = weighting factor
$C$ = normalization factor
$P_i$ = probability figure for each item of equipment.

9. A method as claimed in claims 1 or 2 wherein the evaluations are carried out using the processor of a stored program control type exchange.

10. A method for determining in real time the existing relative capability of a telephone exchange to perform its overall expected functions when some items of its equipment are not functioning and the relative priorities for repairing selected items of such non-functioning equipment so as to most expeditiously maximize the capability of the exchange to perform its expected functions, said method comprising the steps of:

measuring normally expected levels of usage for items of equipment in said exchange over a period of time during which substantially all such items of equipment are functioning normally and maintaining up-to-date machine accessible data files containing such traffic analysis data;

monitoring the actual current availability of said items of equipment which are functioning normally and abnormally and maintaining up-to-date machine accessible data files containing such maintenance data; and determining in real time, using said data files, the existing relative capability of the telephone exchange to perform its overall expected functions at a given time and the relative priorities for repairing specific ones of said items of equipment so as to most expeditiously maximize such capabilities.

* * * * *